(12) United States Patent
Sankaran et al.

(10) Patent No.: US 8,370,191 B2
(45) Date of Patent: Feb. 5, 2013

(54) METHOD AND SYSTEM FOR GENERATING QUANTITATIVE INDICATORS

(75) Inventors: Chandran Sankaran, Redwood City, CA (US); Chad Gray, Redwood City, CA (US); Craig Doud, Belmont, CA (US)

(73) Assignee: Zyme Solutions, Inc., Redwood City, CA (US)

( * ) Notice: Subject to any disclaimer, the term of this patent is extended or adjusted under 35 U.S.C. 154(b) by 223 days.

(21) Appl. No.: 12/686,717

(22) Filed: Jan. 13, 2010

(65) Prior Publication Data

US 2010/0318408 A1 Dec. 16, 2010

Related U.S. Application Data

(60) Provisional application No. 61/187,330, filed on Jun. 16, 2009.

(51) Int. Cl.
*G06Q 10/00* (2006.01)
*G06Q 30/00* (2006.01)

(52) U.S. Cl. ............ 705/7.33; 705/7.29; 705/7.36; 705/7.37; 705/7.39; 705/300; 705/348

(58) Field of Classification Search ........ 705/7.11–7.42, 705/300, 348
See application file for complete search history.

(56) References Cited

U.S. PATENT DOCUMENTS

| | | | | |
|---|---|---|---|---|
| 6,061,691 A * | 5/2000 | Fox | ...................................... | 1/1 |
| 6,792,399 B1 * | 9/2004 | Phillips et al. | .............. | 705/36 R |
| 7,444,307 B2 * | 10/2008 | Heires et al. | .................. | 705/400 |
| 2002/0072954 A1 * | 6/2002 | Sales | ............................... | 705/10 |
| 2003/0004825 A1 * | 1/2003 | Olson et al. | ..................... | 705/26 |
| 2010/0057786 A1 * | 3/2010 | Hardy-McGee | ............. | 707/203 |

OTHER PUBLICATIONS

Cherian, Tunia, Marketing: A decade on, Amway feels it had just started out, Businessline, May 6, 2008.*

* cited by examiner

*Primary Examiner* — Jason Dunham
*Assistant Examiner* — Amber Altschul
(74) *Attorney, Agent, or Firm* — Klarquist Sparkman, LLP

(57) ABSTRACT

A method of generating a quantitative indicator of sales for a market segment for a predetermined time period is disclosed. The market segment represents a plurality of members with one or more products. The method includes receiving sales data from the plurality of members of the market segment, calculating the quantitative indicator for each member of the market segment, calculating the quantitative indicator for the market segment by creating a composite of the quantitative indicator for each member representing the market segment, and either calculating the quantitative indicator for the member with missing data using a estimated value of units of the product sold by the member or modifying the baseline benchmark by removing the data of the member with missing data.

17 Claims, 17 Drawing Sheets

| | Measurements | Passing Criteria | Items to Note on (internal) data exceptions report |
|---|---|---|---|
| How complete is the data? | | | |
| | Percent of rows "Valid", "NoPOS", "NoINV", Avg, Invalid for most recent week overall | >80% "valid" for overall dataset; >70% "valid" for each client (exclude NoINV from partners not reporting inventory) | Overall Valid, NoPOS, NoINV, etc… scores; Five largest non "valid" partners for most recent week (based on historical average POS & INV levels) |
| | Percent of rows "Valid", "NoPOS", "NoINV", Avg, Invalid by country | N/A | List of any countries with less than 80% of "valid" rows for latest week |
| | Percent of rows "valid" etc… for weeks prior to most recent week (i.e., first 12 of the 13 weeks) | >90% "valid" for overall dataset; >80% "valid" for each client (exclude NoINV from partners not reporting inventory) | |
| How clean is the data? | | | |
| | Pass-rate from initial roll-forward checks performed by client analyst teams | Tests have been performed on at least __% of data set by client teams Errors found on less than __% of tests conducted | % of test coverage (approx?); error rate on testing conducted |
| How consistent is the data? | | | |
| | Percent of rows matching with existing master country/partner names | 100% matching existing country names; 100% matching existing partner names, or manual verification that any non-matches are really newly reporting partners | 100% matching existing country names; 100% matching existing partner names, or manual verification that any non-matches are really newly reporting partners |
| | Percent of INV or POS values changed on weeks 1 - 12 vs previous week's data extract | <5% of values in weeks 1 - 12 restated this week relative to previous extract | Before and after values for any changes made to prior weeks' data, annotations for significant changes |

Figure 3

| No. | Name | Description | Algorithm | Where Used |
|---|---|---|---|---|
| 4.1 | Channel Activity | Number of units weighted by dollars that move through a defined channel segment in a given week, month, quarter or year. | | Channel Activity Index |
| 4.2 | Channel Activity Index | The ratio of the current week channel activity level for a specific channel segment over the channel activity for the same week in 2007. | | Channel Activity Growth |
| 4.3 | Channel Activity Growth | The percentage channel activity has grown or declined over a given time period. | The ratio of the current week channel activity level for a specific channel segment over the channel activity for some prior defined week. | Figure 6.2 |
| 4.4 | Channel Activity Seasonality | The percentage of annual channel activity volume which would be transacted during a given week within a calendar year. | The ratio of the current week channel activity over the total channel activity for a calendar year. Each resulting ratio for each week is then averaged across the ratios for the same week in previous years. | Figure 6.4 and 6.5 |
| 4.5 | Projected Channel Activity Growth | For the current quarter or year, a projection of the level of expected channel activity through the end of the current quarter or year. | The linear regression of the line that is formed by the ratio of the current period to date cumulative channel activity level divided by the cumulative channel activity level for the previous year. The projected line of regression is then adjusted for current period uncertainty and current | Figure 6.5 |

FIG. 4A

| | | | period seasonality. | |
|---|---|---|---|---|
| 4.6 | Channel Volume Raw | The volume of channel activity reported transacted through a channel segment. | The number of units dollar weighted units that were reported for a specific channel segment at a specific point in time. | |
| 4.7 | Channel Composition | The share of the channel volume that is transacted through a particular channel segment. | The ratio of weeks of inventory of a single segment divided by the weeks of inventory for all segments within a defined group. | Figure 6.3 |
| 4.8 | Channel Size Rank | The rank based on channel volume of a channel segment among a defined group of segments. | The ratio of channel volume for a segment over the combined channel volume for all segments within the group. The ordered from largest to smallest and then a value of one for the largest and N for the smallest. | Figure 6.9 |
| 4.9 | Channel Inventory | Count of inventory units. | Number of units of inventory that are reported for a specific time and channel segment intersection. | |
| 4.10 | Weeks of Inventory | The number of weeks the current units of inventory will be sufficient to supply the current rate of channel activity. | "Weeks of inventory" calculated as the four week moving average inventory weighted average divided by four week moving average weighted channel activity. | Figure 6.6 |
| 4.11 | Inventory Turns | The number of times the equivalent value of channel activity will move through inventory. | 52 weeks over weeks of inventory. | Figure 6.8 |

FIG. 4B

| Measurements | Passing Criteria | Items to Note on (internal) data exceptions report |
|---|---|---|
| Are results being skewed by any statistical anomalies? | | |
| Sales growth (or sales momentum) data points showing up significantly above / below expected range | Manually verify driver of anomaly (e.g., single partner with significant net returns, unusually high baseline comparison point) | Note any anamolies, along with conclusions on factors driving |
| Inventory data points showing significantly above/below expected range (especially at partner level) | Manually verify driver of anomaly (e.g., increase in units onhand, *decrease in sales*, apparent shift in average calculated per unit value). Confirm accuracy of suspicious looking data | Note any anamolies, along with conclusions on factors driving |
| Are Index values being skewed by inclusion of any clients? | | |
| Outlier values skewing Index | Identify and remove outlier clients skewing index within each analysis (worldwide inventory, EMEA sales growth, US Retail Inventory, etc…), especially where outlier client has a comparatively small dataset in that region/country. [ as a rule of thumb, any client more than 2x or less than 1/2 the average of others in the index is a candidate for removal ] | List any indexes where outlier clients have been removed, along with before/after impact of Index, and qualitative factors suggesting removal |
| How valid is the comparison to the Index dataset? | | |
| Historical correlation between client and Index Point Of Sale data | No "pass criteria" - just for informational purposes. | Note coefficient of correlation for worldwide, appropriate regions, appropriate countries. Expected values in the 0.3 to 0.7 range with highest values on narrowest geographies (i.e., countries). |

Figure 5

| | Measurements | Passing Criteria | Items to Note on (internal) data exceptions report |
|---|---|---|---|
| Has the data been completely & correctly inputted to the client-ready document? | | | |
| | Accuracy check for each number and graph on the client doc vs. analytics output | 100% accuracy | |
| | Consistency check between pages in the document (*"full document"* only) so that UK growth is the same on each page it appears | 100% accuracy | |
| Is the chart visually correct (fonts, colors, scales, etc...)? | | | |
| | Visual checks for proper formatting, incl.:<br>- color of red/green values<br>- rounding error (A - B = C)<br>- Y axis scaling of charts<br>- correct manual placement of Z.I. line<br>- placement of value labels<br>- legibility of bar labels (country names, partner names)<br>- etc... | 100% accuracy | |
| Do the results make sense? Are outlier points correct? | | | |
| | CSM / client team review of end product | | Identify and re-verify any results that appear not to make intuitive sense based on the client behavior |
| | Review compared to previous week's / month's update. | | Identify and re-verify any results that diverge significantly from prior period's results |

Figure 7

METHOD AND SYSTEM FOR GENERATING QUANTITATIVE INDICATORS

CROSS-REFERENCE TO RELATED APPLICATIONS

This application claims the benefit of U.S. Provisional Application No. 61/187,330, filed on Jun. 16, 2009. The entire disclosure of the above application is incorporated herein by reference.

BACKGROUND OF THE INVENTION

1. Field of the Invention

The document relates in general to a method and system for generating quantitative indicators. More particularly the documents relates to a method and system for generating a reliable index of the performance of a market basket of products within specified market segments at real time, using data with missing or unreliable elements.

2. Description of the Prior Art

All industries, in particular, the consumer-oriented and small business oriented technology industry rely heavily on channel resellers rather than direct to end user sales of their products. A typical major original equipment manufacturer of end products may have channel agreements in place with hundreds of channel partners, who then in turn resell to end users or resell to a smaller retailer or to value added reseller who are not large enough to justify a direct contract with the original equipment manufacturer.

Companies therefore require a clearer view of what products are selling through their global, multi-tiered channel, what products remain in channel inventory and how promotions are performing at any given time. Many important decisions around revenue recognition, channel promotions, sales commissioning and manufacturing operations rely on having this clarity.

Currently, manufacturers, researchers and investors have no established credible, timely, and detailed measurement of the health of worldwide electronics reseller channels. Moreover, each user group has a unique set of priorities and interests. Broadly information is required to optimize operations of their channel or that of their clients, to separate the channel trends that are broadly shared across the channel from those that may be indicators of the market's response to their products, and to get an additional proxy for the health of various economies.

Many mature research services exist that are aimed at identifying what is selling within a certain product category, but far less data exists that describes how it is selling within the channel. Typically available research focuses on a narrowly defined product category and provides worldwide (and in limited cases, regional) information about past and future sales of that product through the different channels.

One common approach for measurement of product sales that is used by market research firms is to purchase point of sale data from certain major retailers and distributors, bundle into sales and market share estimates and provide on a subscription basis to interested audiences. However this data represents only a subset of channel outlets and thus is not representative of the channel overall. Since only certain segments of the channel are willing to provide point of sale data for sale, the sample of data cannot be considered representative of the entire channel. As a result of this, trends between channels (e.g., from retail to online) cannot be reliably measured. Moreover, this approach does not allow uniform global coverage.

Another approach used by market research firms that target a specific niche of the technology market is to arrange with each major original equipment manufacturer in that segment to provide confidential sales results and forecasts directly to them. The market research firm then pools inputs from each of the original equipment manufacturers, presents back overall market size and share, and sells the reports back to the contributing original equipment manufacturers and other audiences.

Yet another approach used by market research firms is to conduct surveys of end user/buyers for technology goods, often corporate IT managers. From the survey results about past/future procurement, the research firms extrapolate trends and market growth rates. In addition analysts or investors will often conduct "channel checks" by gathering anecdotal observations about how much is selling, what products are selling best, etc., from contacts inside of one or two resellers or distributors.

These approaches all rely to a greater or lesser extent on self reporting which is at risk of gamesmanship as is the case when original equipment manufacturers are reporting their forecasts or other inaccuracy or embellishment.

In light of these short comings there is a need for a system and method for generating consistently reliable quantitative indicators of the performance of a market basket of products within specified market segments. The system should be such that it has the ability to aggregate multiple data types over different time horizons to create a single index.

SUMMARY OF THE INVENTION AND ADVANTAGES

A method of generating a quantitative indicator of sales for a market segment for a predetermined time period is disclosed. The market segment represents a plurality of members with one or more products. The method includes receiving sales data from the plurality of members of the market segment, the sales data including the number of units of the product sold over the predetermined period of time, calculating the quantitative indicator for each member of the market segment, the quantitative indicator being a ratio of the number of units of the product sold by the member in the predetermined time period to the number of units sold by the member in a baseline period multiplied by a baseline benchmark, the baseline benchmark being the quantitative indicator for the member in the baseline period, wherein the baseline period is the period prior to the predetermined period, calculating the quantitative indicator for the market segment by creating a composite of the quantitative indicator for each member representing the market segment, the calculation of the quantitative indicator including determining missing sales data for a member forming the market segment; and either calculating the quantitative indicator for the member with missing data using a estimated value of units of the product sold by the member or modifying the baseline benchmark by removing the data of the member with missing data.

A system for generating a quantitative indicator of sales for a market segment for a predetermined time period is disclosed. The market segment represents a plurality of members with one or more products. The system includes a data loader configured for receiving sales data from the plurality of members of the market segment, the sales data including the number of units of the product sold over the predetermined period of time, a processing engine configured for generating the quantitative indicator of sales for a market segment, the processing engine including a metric manager configured for calculating the quantitative indicator for each member of the market segment, the quantitative indicator being a ratio of the number of units of the product sold by the member in the predetermined time period to the number of units sold by the member in a baseline period multiplied by a baseline benchmark, the baseline benchmark being the quantitative indicator for the member in the baseline period, wherein the baseline period is the period prior to the predetermined period, missing data manager configured for determining missing sales data for a member forming the market segment, and an index generator configured for calculating the quantitative indicator for the market segment by creating a composite of the quantitative indicator for each member representing the market segment, the calculation of the quantitative indicator including determining missing sales data for a member forming the market segment; and either calculating the quantitative indicator for the member with missing data using a estimated value of units of the product sold by the member or modifying the baseline benchmark by removing the data of the member with missing data.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The accompanying drawing illustrates the preferred embodiments of the invention and together with the following detailed description serves to explain the principles of the invention wherein:

FIG. 3 illustrates an example of a report generated by the health index;

FIGS. 4A-B tabulates a list of matrices and associated calculation algorisms;

FIG. 5 illustrates a report generated after quality checks tests are conducted on a raw index by way of an example;

FIG. 7 tabulates a report generated after quality checks are conducted on the final reports by way of an example.

DETAILED DESCRIPTION OF THE INVENTION

Figure 1:
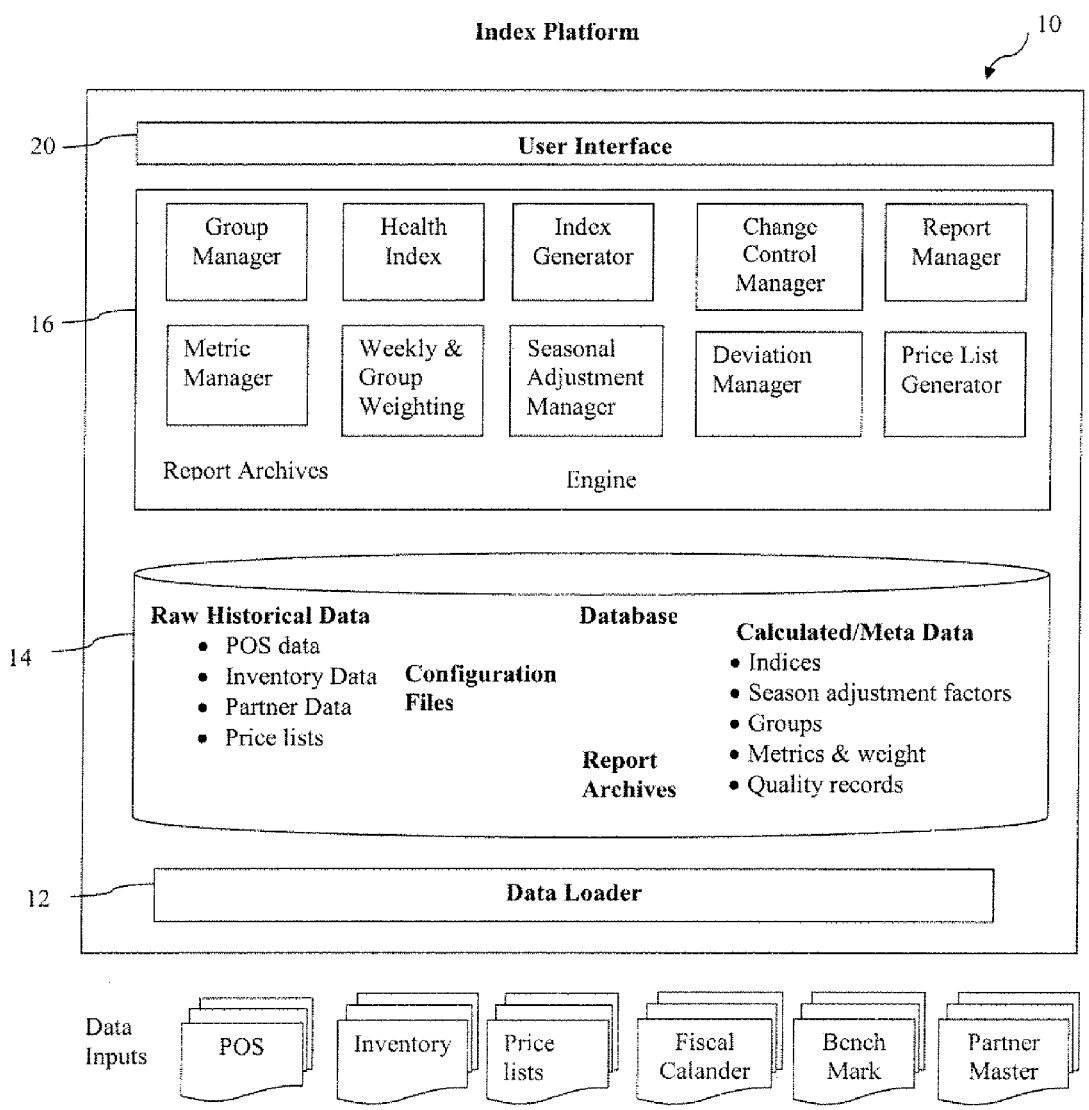
FIG. 1 illustrates a system for generating an index in accordance with an embodiment.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated method and system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof. Throughout the patent specification, a convention employed is that in the appended drawings, like numerals denote like components.

Reference throughout this specification to "one embodiment" "an embodiment" or similar language means that a particular feature, structure, or characteristic described in connection with the embodiment is included in at least one embodiment of the present invention. Thus, appearances of the phrase "in one embodiment", "in an embodiment" and similar language throughout this specification may, but do not necessarily, all refer to the same embodiment.

Many of the functional units described in this specification have been labelled as modules, in order to more particularly emphasize their implementation independence. For example, a module may be implemented as a hardware circuit comprising custom very large scale integration circuits or gate arrays, off-the-shelf semiconductors such as logic, chips, transistors, or the other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organised as an object, procedure, or function. Nevertheless, the executables of an identified module need not be physically located together, but may comprise disparate instructions stored in different locations which, when joined together, comprise the module and achieve the started purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organised within any suitable type of data structure. The operational data maybe collected as a single data set, or may be distributed over different locations including over different member disks, and may exist, at least partially, merely as electronic signals on a system or network.

A process and system for generating a quantitative indicator of sales for a market segment for a predetermined time period is disclosed. The market segment represents a plurality of members with one or more products.

A process and system for generating indicators of sales channel activity is disclosed. More particularly a process and system for generating a reliable index in real time using data with missing or unreliable elements is disclosed.

With reference to FIG. 1, a system for generating an index in accordance with an embodiment is illustrated. The system comprises of an index platform (10) comprising of a data loader (12), a database (14), a processing engine (16) and a user interface (18).

The data loader (12) is configured for receiving data from the plurality of members of the market segment. The data received by the data loader (12) includes sales data. The sales data includes the number of units of the product sold over a predetermined period of time.

The data loader (12) also allows other kinds of data to be added to the index platform (10). The data that may be added into the data loader includes but is not limited to Point of Sale (POS), inventory data, price lists, fiscal calendars, partner master and quantitative benchmark data.

In accordance with an aspect, the data loader is configured for receiving data in various electronic formats. The data loader (12) allows data from multiple sources and in various electronic formats to be received by the system and aggregated into the single database (14).

The data received by the data loader (12) is aggregated into the database (14). The database (14) stores data specific for managing the index calculation, quality control and report generation processes. The data stored on the database (14) includes but is not limited to various segments that are dynamically generated groupings of categorical variables generated by the engine (16), currency conversion factors including present and historical currency conversion factors, seasonal adjustment factors including present and historical seasonal adjustment factors, raw transactional point of sales data, raw inventory data, price lists including present and historical price lists, quality records including records of health indices, benchmark values and cross check value. The database (14) also stores all historical time stamped index calculations.

The index platform (10) further comprises of the processing engine (16). The processing engine (16) is the computational component, quality control management and business rule management module of the index platform (10). The processing engine (16) is configured for generating the quantitative indicator of sales of a market segment. The processing engine (16) also allows the user to define certain business rules and meta data and then executes the computation of various metrics based on the users definition.

The processing engine (16) comprises of a metric manager (22), a missing data manager and an index generator (38). The metric manager (22) of the processing engine (16) is configured for calculating the quantitative indicator for each member of the market segment. The quantitative indicator for each member of the market segment is calculated by taking a ratio of the number of units of the product sold by the member in the predetermined period of time to the number of units sold by the member in the baseline period and multiplying it by a baseline benchmark, the baseline benchmark being the quantitative indicator for the member in the baseline period. The metric manager (22) also enables the user to manage equations associated with the metrics such as channel activity, weeks of inventory, channel composition, seasonal factors, channel activity projections and segment index.

In accordance with an aspect, the processing engine further comprises of the missing data manager that is configured for determining if the sales data received by the data loader is missing for a member forming the market segment. The missing data manager further indicates if the data for the members of the market segment with missing data is to be estimated or if the data of the missing member should be removed. In accordance with an aspect, the indication of whether the data should be estimated or removed is carried out by the missing data manager by comparing the time period for which the data is missing to a predefined time period. By way of a specific example if the data is missing only for one week the missing data manager will indicate that the data be estimated.

The index generator (38) is the core calculation engine that calculates the quantitative indicator for the market segment based on the calculations carried out by the metric manager (22) and on the bases of the missing sales data determined by the missing data manager. The index generator (38) calculates the quantitative indicator for the market segment as a composite of the quantitative indicator for each member representing the market segment calculated by the metric manager (22). In accordance with an aspect, the index generator (38) further calculates the quantitative indicator for the member with the missing data determined by the missing data manager by using an estimated value of the units of the product sold by the member, which is then used to calculate the quantitative indicator for the market segment. The index generator (38) may alternatively calculate the quantitative indicator for the market segment by modifying the benchmark by removing the data of the member with the missing data.

The system further comprises of the user interface (18). The user interface allows the index platform (10) to be accessible to the user via a web browser client. Multiple users may be able to concurrently access the core database and application functions to perform all routine features including loading, modifying, processing, and extracting data and calculations. In accordance with an aspect the user interface (18) is configured for allowing a member of the market segment to directly input the sales data onto the data loader (12).

In accordance with an aspect the system may further comprise of a report manager or report generator (34), configured for preparing various reports based on the quantitative indicators calculated by the index generator. The report manager (34) allows the user to define which metrics and categorical variables to include in a particular report set. It also, lets the user retrieve past versions of reports.

Figure 2:
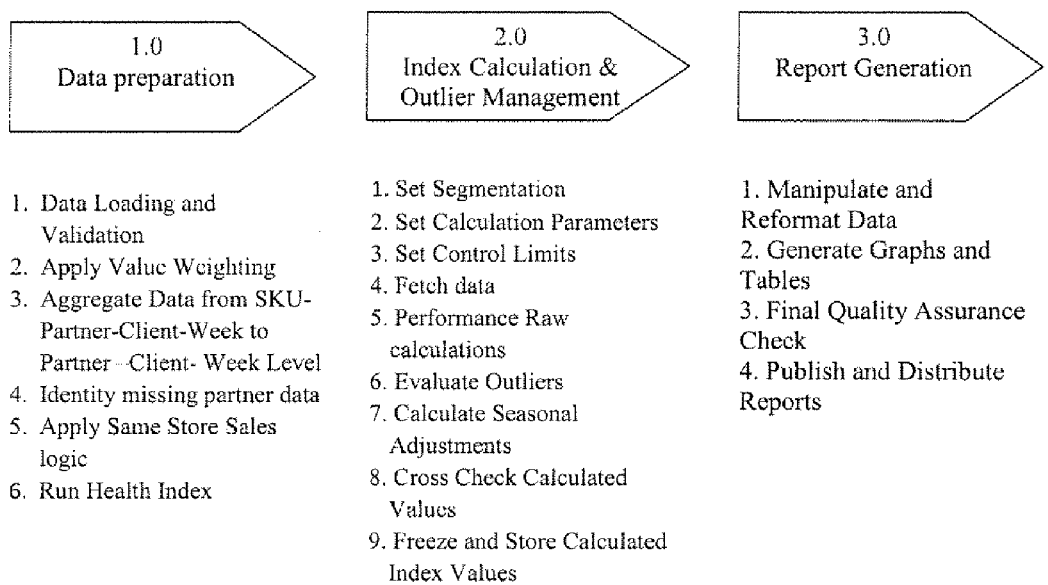
FIG. 2 illustrates a process for generating an index in accordance with an embodiment.
Figure 6A:
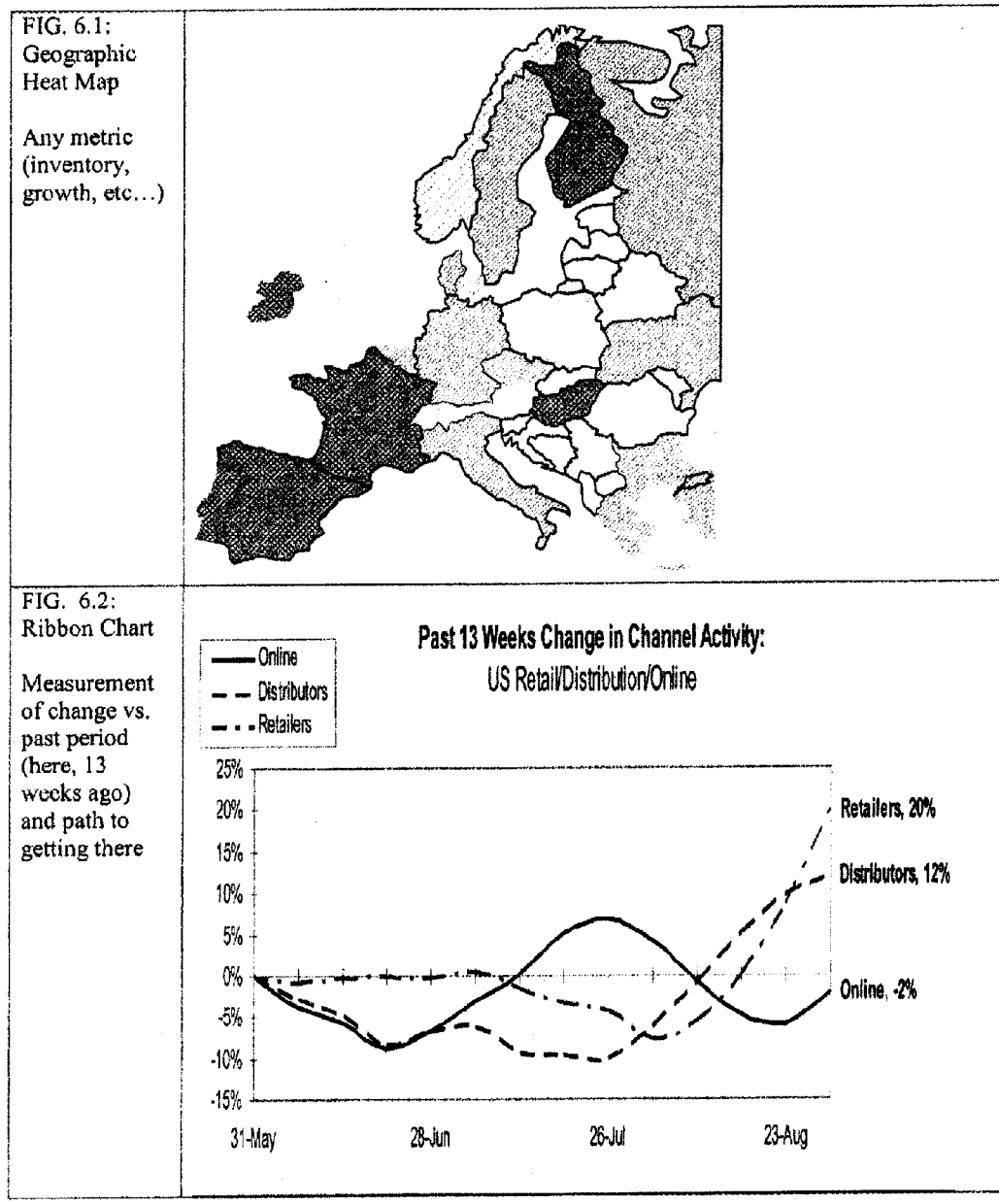
FIGS. 6A-J illustrates various reports that may be produced.
Figure 6B:
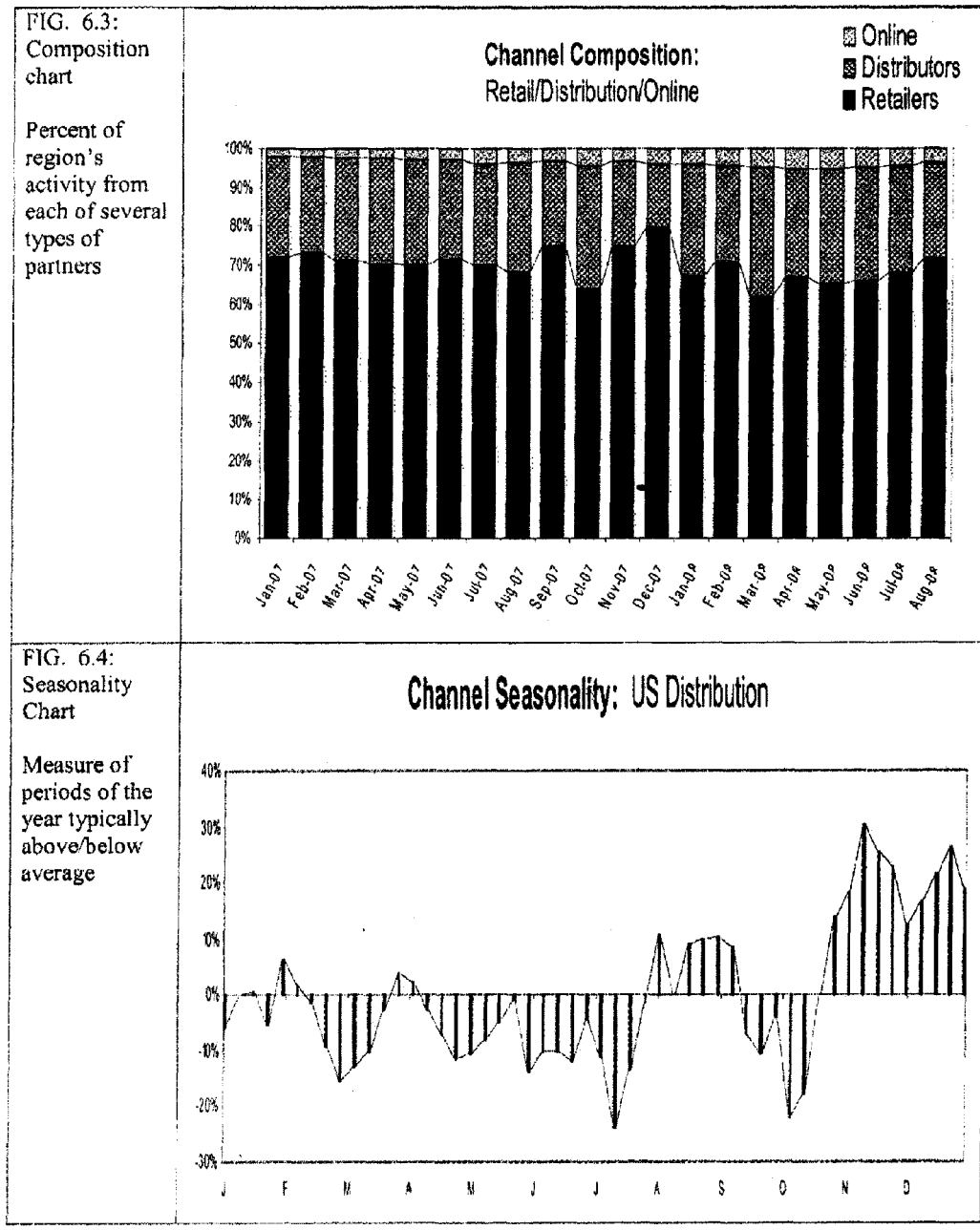
Figure 6C:
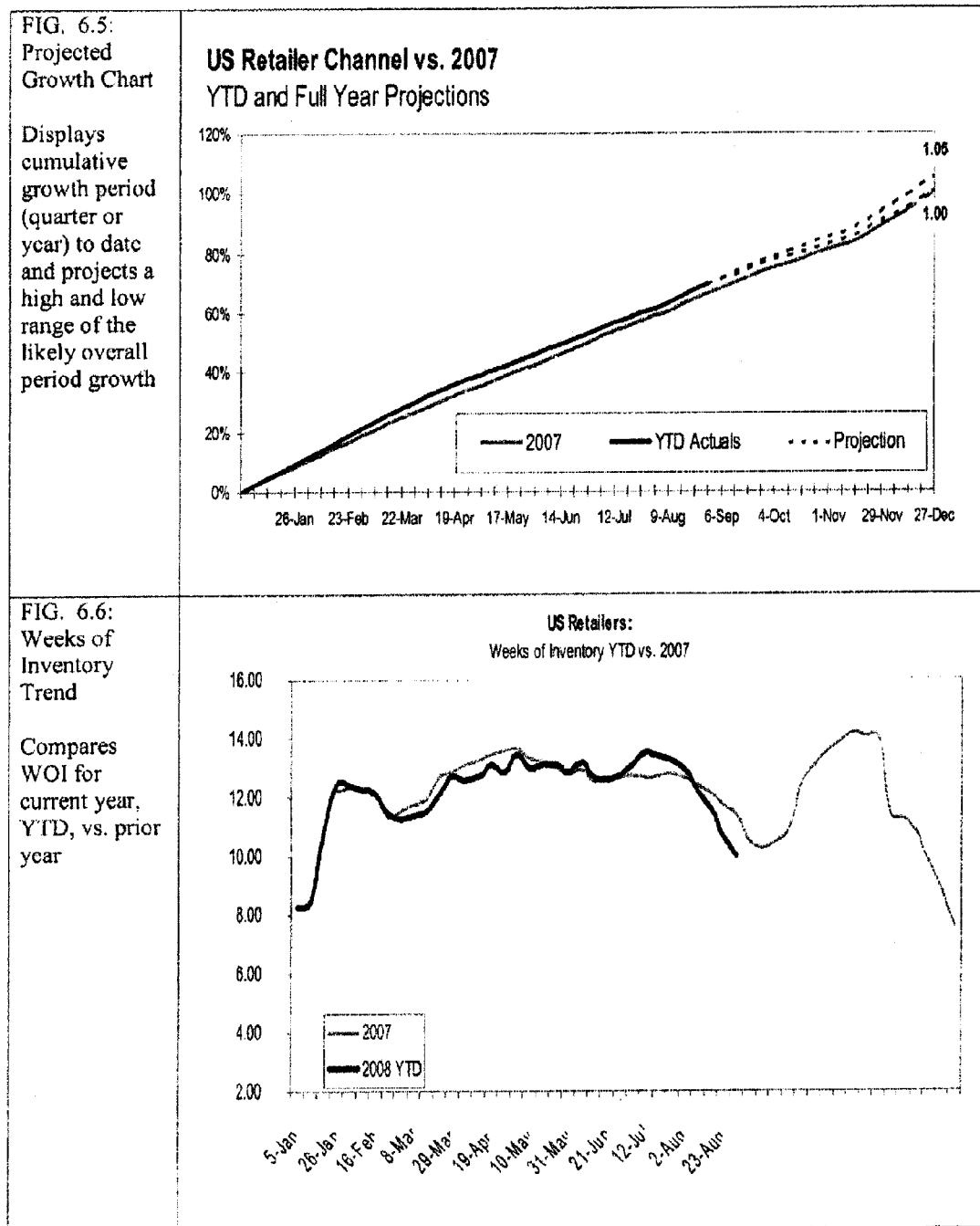
Figure 6D:
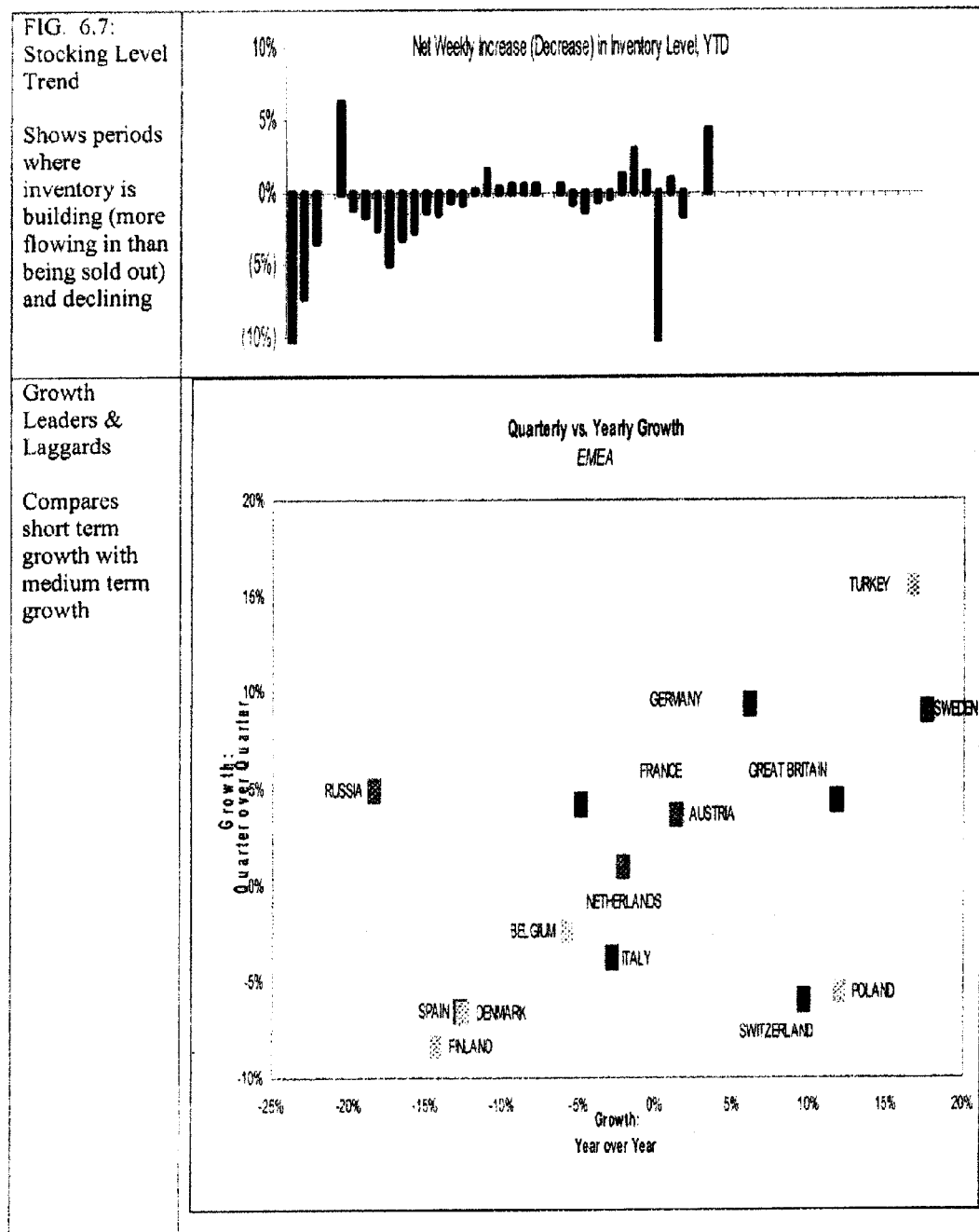
Figure 6E:
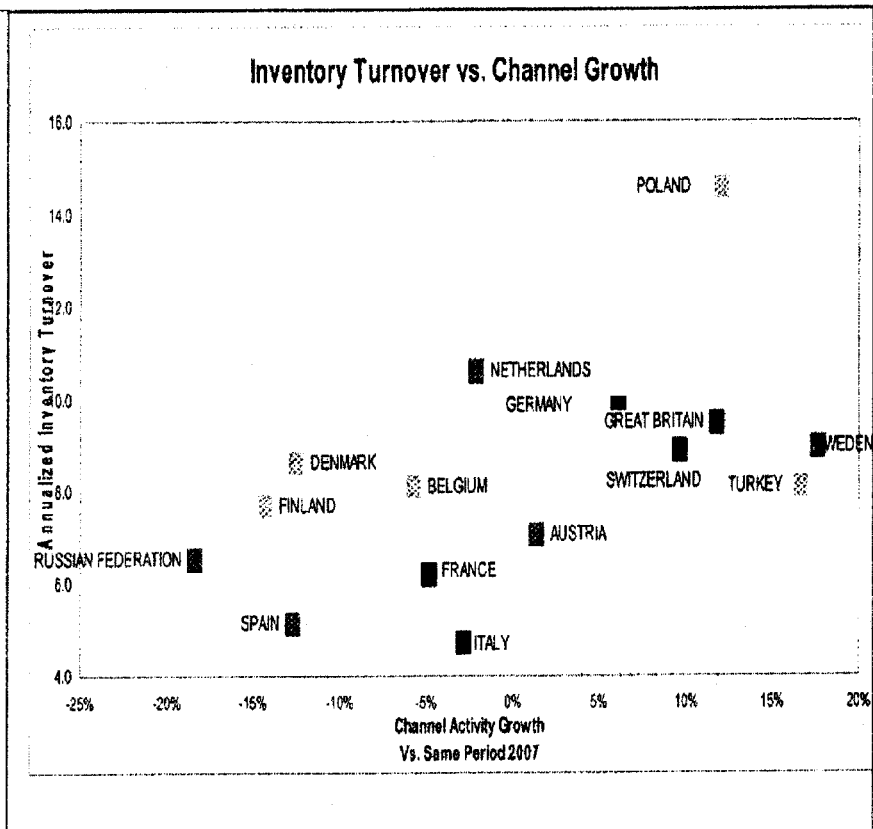
Figure 6F:
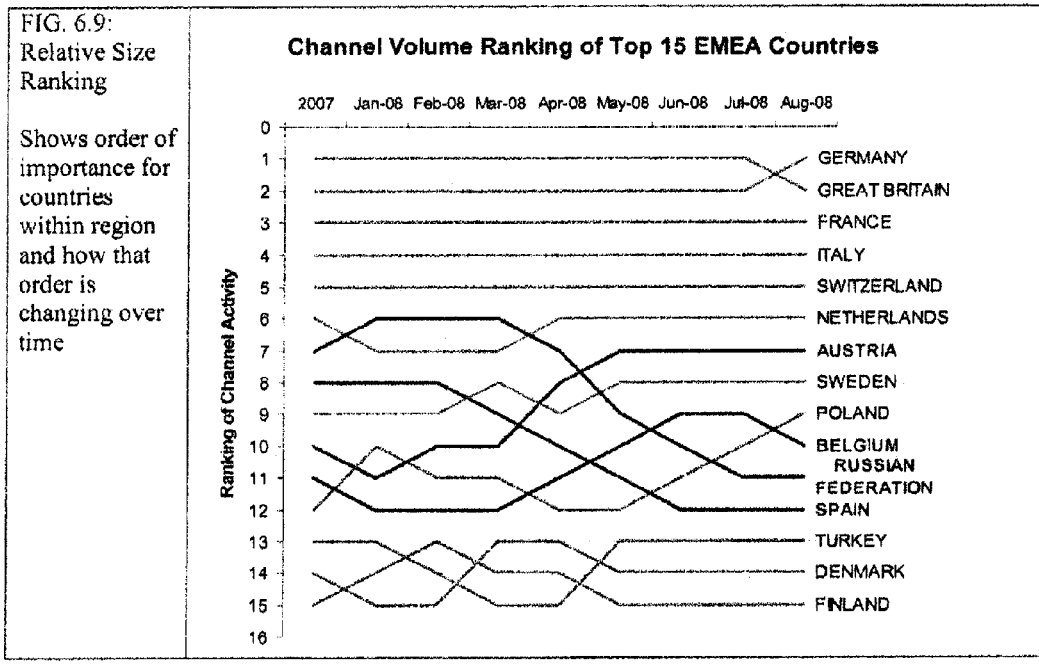
Figure 6G:
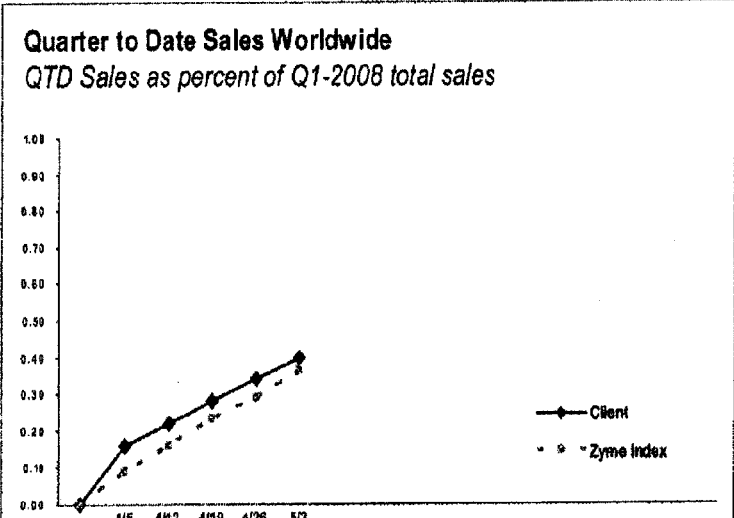
Figure 6H:
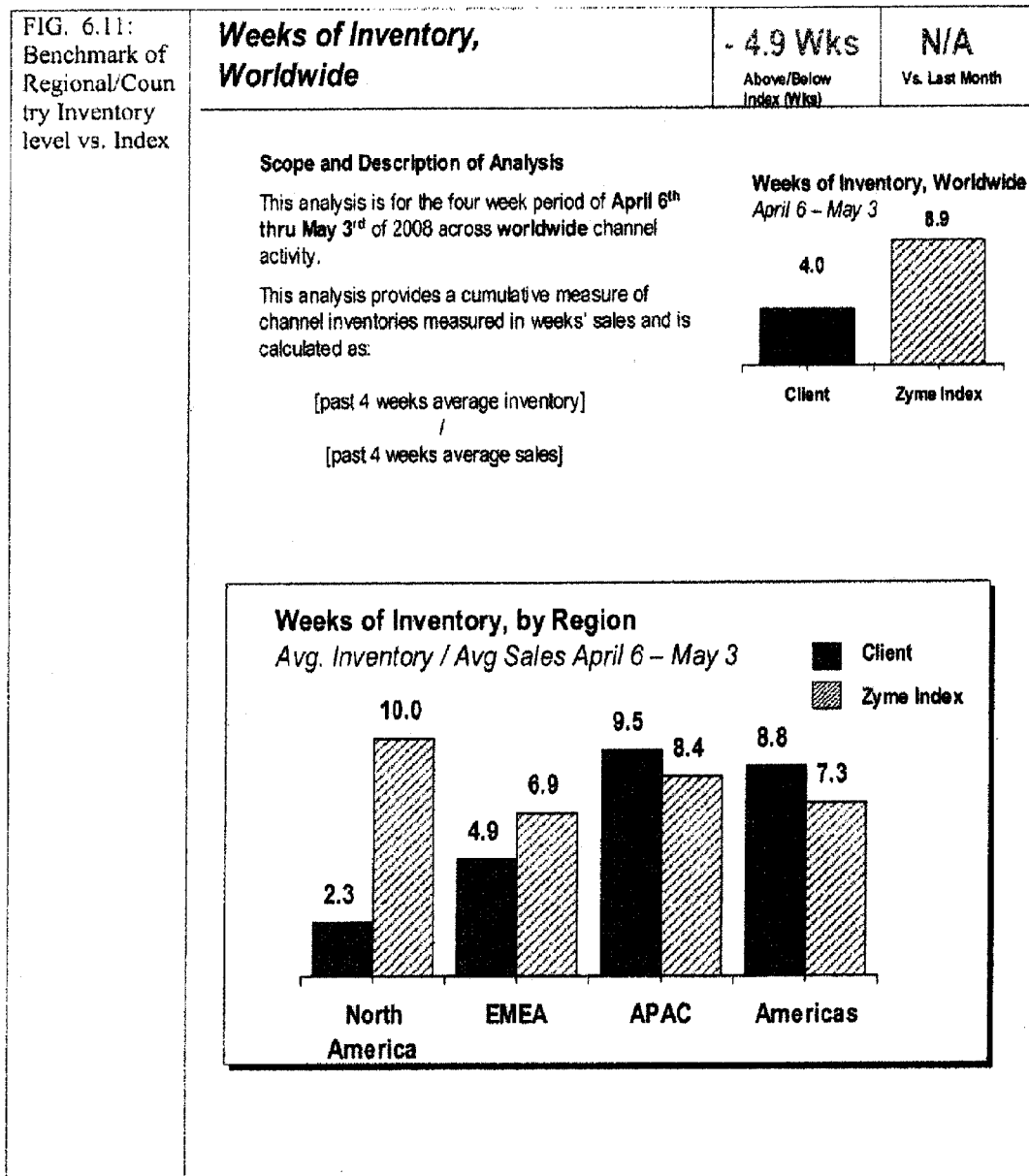
Figure 6I:
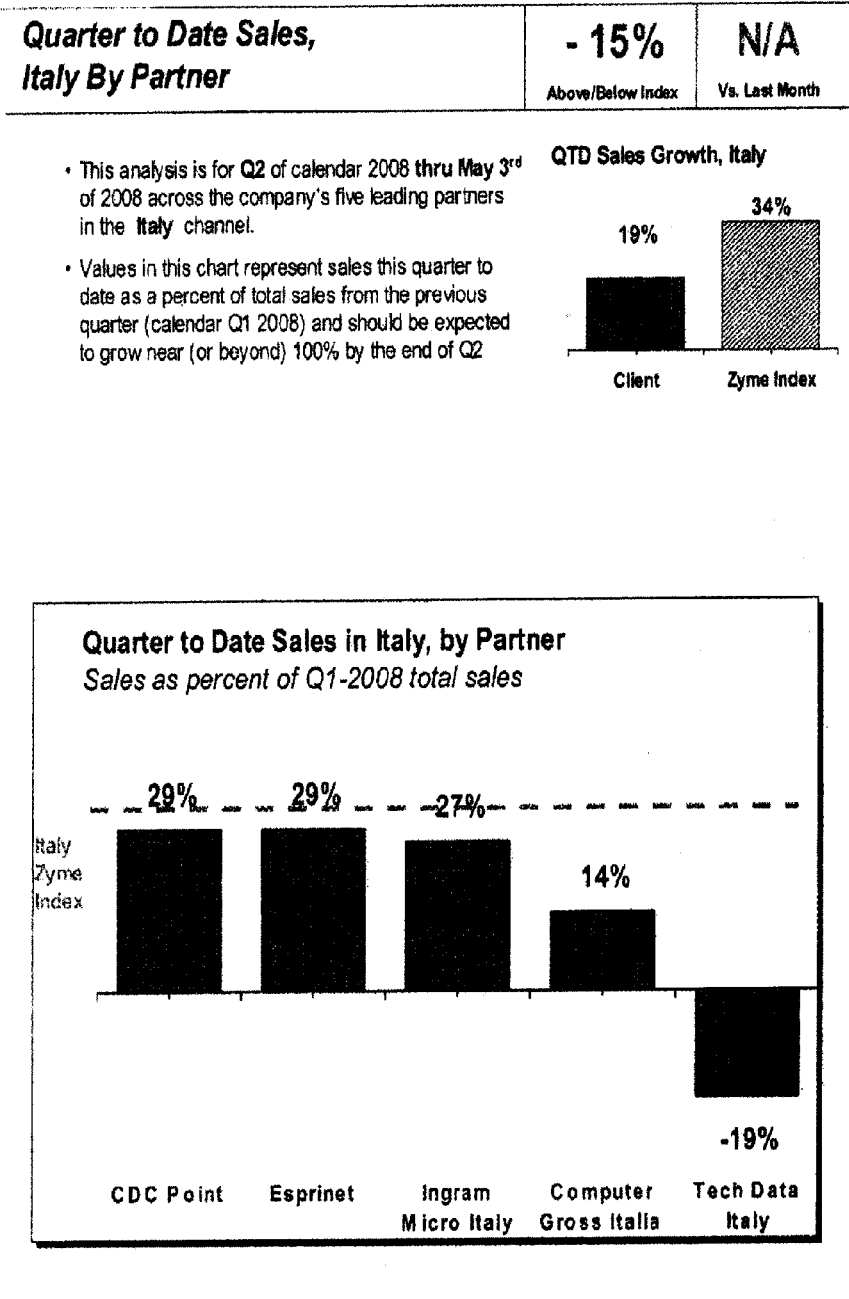
Figure 6J:
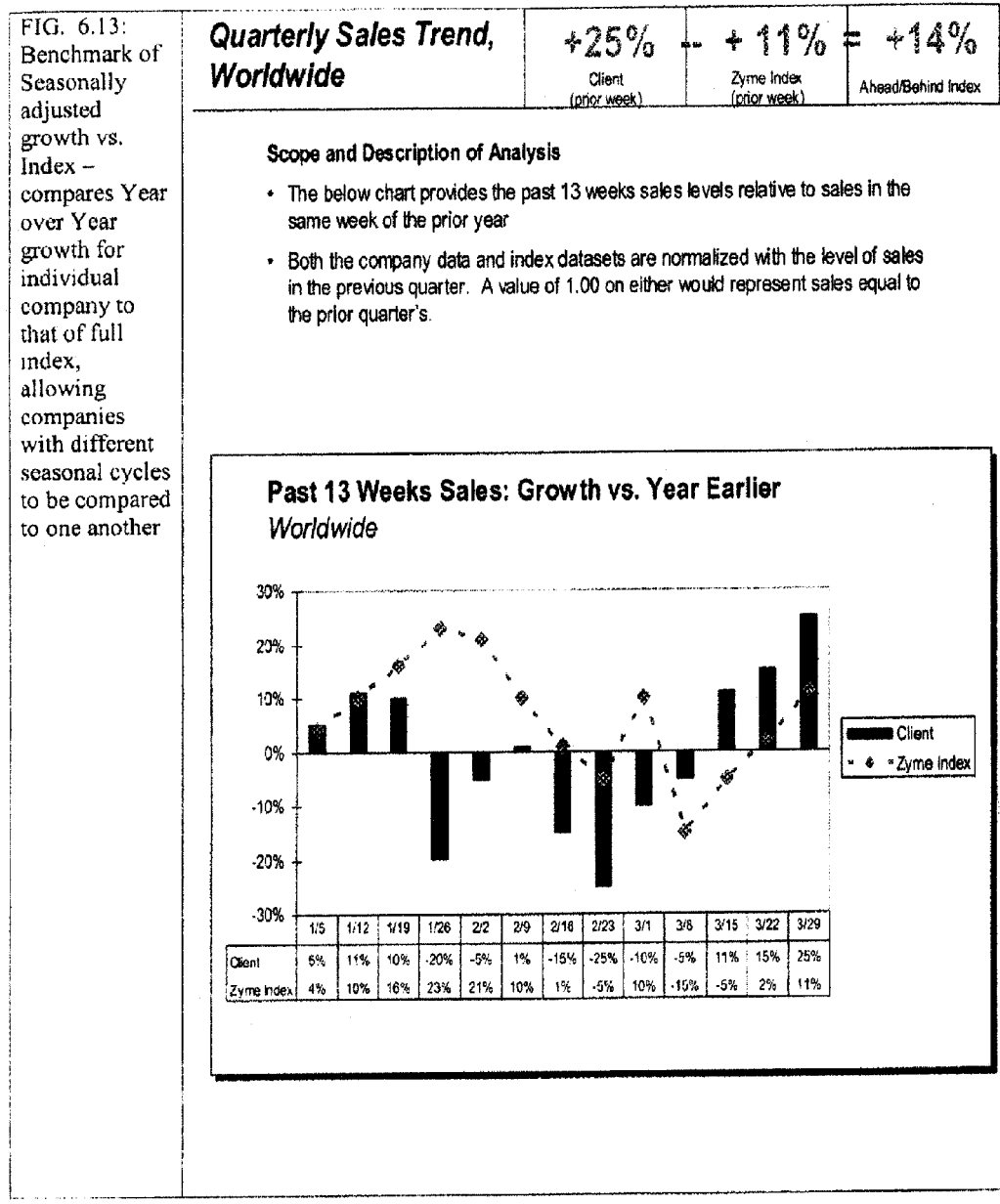

In accordance with an embodiment, the processing engine (16) may further comprise of a group manager (20), a health index (24), a weekly and group weighting module (26), a price list generator (28), a seasonal adjustment factor module (30), a deviation manager (32), and a change control manager (36) as illustrated in FIG. 2.

The group manager (20) allows the user to dynamically define new groupings combinations of categorical variables and subsequently generated index values for each segmented group.

The health index (24) allows the user to set various factors associated with producing the quality metrics including health index, back-test metric and cross check metric. The weekly and group weighting module (26) allows the user to define the weight to assign to past weeks for use in rolling average calculations. The module also allows the user to apply weights from zero to one at group (country, channel, product group, price group) level.

The price list generator (28) creates an up to price list based on current customer price list, reported prices and inferred prices from past transactions. The seasonal adjustment factor module (30) allows the users to set control limits and time periods for computation of seasonal adjustment factors. The deviation manager (32) allows the user to manual override the engine to exclude data points from use in index calculations. The change control manager (36) provides check-out and check-in functionality to the system allowing multiple users to access and modify data concurrently while avoiding instances of incompatible changes made by different users simultaneously.

A process for generating indicators of sales channel activity is disclosed. More particularly a process for generating quantitative indicators of sales for a market segment for a predetermined time period is disclosed. The market segment represents a plurality of members with one or more products.

The process comprises of receiving sales data from the plurality of members of the market segment. The sales data includes the number of units of the product sold over the predetermined period of time. The sales data received for the member of the market segment is used to calculate the quantitative indicator for each member of the market segment, the quantitative indicator being the ratio of number of units sold by the member in the predetermined time period to the number of units sold by the member in a baseline period multiplied by a baseline benchmark. The baseline benchmark is the quantitative indicator for the member in the baseline period. The baseline period is the period just prior to the predetermined period.

The quantitative indicator for the market segment is calculated as a composite of the quantitative indicator for each member representing the market segment.

In accordance with an aspect the process for generating the quantitative indicator for market segment further comprises of determining missing data for a member forming the market segment. The quantitative indicator for the member with the missing data may be calculated using an estimated value of the units of the product sold by the member, which is then used to calculate the quantitative indicator for the market segment.

Alternatively the quantitative indicator for the market segment may be calculated by modifying the benchmark by removing the data of the member with the missing data.

In accordance with an embodiment, the process further comprises of calculating quantitative indicator for a new member added to the market segment. The quantitative indicator for a new member added to the market segment is calculated by taking ratio of number of units of the product sold by the new member in the predetermined period time period to the number of units sold by the new member in the baseline period and multiplying it by the quantitative indicator of the market segment in the baseline period.

With reference to FIG. 2, the process for generating quantitative indicator for a market segment comprises of data collection, index calculation and outlier management and report generation.

The process comprises of receiving sales data from a plurality of members of the market segment. The sales data includes the number of units of the product sold over the predetermined period of time. The data received may also include the unit count in hand for each product or stock keeping unit (SKU) carried.

In accordance with an aspect the sales data is received in a plurality of formats. The sales data received in plurality of formats is consolidated into a single electronic format. In accordance with an aspect, the data is collected on weekly basis. In accordance with an embodiment sales data may be received from all partners associated with an original equipment manufacturer. The data provided daily and weekly is loaded into the index database (14).

Once the data is loaded, the index platform runs quality assurance algorithms on the data loaded to check the completeness and accuracy of the provided data. The index platform produces quality assurance reports where potential problem data elements are flagged for evaluation. This data is then analyzed using the index platform and other third party analysis tools to perform quantitative and logical checks and then either correct missing data or perform research to identify the best course of action. If the data is missing, incomplete or illogical the partners are contacted to collect missing data and to correct any illogical data. The analyzed and corrected data is known as "Cleansed SKU-Partner-Client-Week" and is stored in the database.

In accordance with an embodiment, the units sold and on-hand are then weighted by price to avoid a high volume, low value products from dominating the overall metric growth. In accordance with an aspect the units reported for each product or SKU are multiplied by price to obtain a value weighted sales amount. In accordance with an aspect, the SKU by SKU pricelists are updated quarterly from each original equipment manufacturer. In accordance with an embodiment, the price list of each SKUs including international SKUs are denominated in US Dollars. The price list of each SKU is also stored in the database. Where category information is available, price lists may be assigned a category average price for each SKU within that category.

In accordance with an aspect, if the price of a SKUs included in the reported data does not appear on the price list, the system may be estimate at median value of implied price from all instances where partners reported a units as well as dollars basis for sales.

The sum of each SKU's weighted amount is calculated for each partner and client for each week combination.

In accordance with an aspect, once the sum of each SKU's weighted amount for each partner and OME is calculated, the missing data manager of the index platform identifies partners with missing weeks of data. As many of the metrics are viewed for trends over time, missing data in a given week can cause false movement in the metric values. Partners with multiple concurrent weeks of non-reported data are flagged for exclusion, but kept in the data file. The partners with isolated instances of missing data are considered for "interpolation" for the missing week's values as the linear average between the preceding and following weeks is calculated by the Index Platform. The items that have been interpolated are also flagged as such for later quality checks.

In accordance with an aspect, another script is run by the index platform to ensure a "same store sales" basis for growth measures as period to period growth metrics (such as quarter to quarter sales growth) are only valid if they include the same reporting partners in the before and after period. By way of specific example the script flags each record in the database as to whether it is matched with a value in a prior period of 13 weeks or 52 weeks prior, for instance.

The data including the interpolated data is then checked for errors by the Health Index. The Health index ensures that an adequate percent of partners have reported valid data. The data within each client-country pairing is also validated for reporting vs. typical levels. In cases where less than acceptable reporting exists, data is put on hold until higher reporting is achieved.

By way of an example, the output is in a "dashboard" format that provides basic red-yellow-green highlights to draw attention to the areas where data is failing. By way of a specific example the report generated is illustrated in FIG. 3.

The cleansed, complete and consistent partner level data is then reorganized. The data is organized in tables by clients, by country, by week, by year and by metric and stored onto the database. This data may now be used for formation of various indexes.

To calculate various indexes a segment is created from the groups of data received using the segment generator, multiple matrixes are defined along with the calculation methodologies using the Metric Manager.

The control limits for each metric is set using the deviation manager. As a means of reducing volatility and increasing representativeness of the various indices, the output of raw calculations is processed through the deviation manager. Each individual component included within a given index is evaluated for outlier values that would, if included, have material impact on the aggregate index. Threshold values to be considered a deviation are determined on a per index basis and are input to the System on the basis of minimum/maximum absolute value and/or minimum/maximum change relative to prior periods. The system retains the set of pre-stabilized values for purpose of future computations requiring raw values as a basis.

The index engine fetches the appropriate POS and/or Inventory data from the system's database. For each time period (e.g., week) to be calculated and within the parameters defined within the metric manager, the database is queried for all Partner-Client-Week level records of both the measurement time period and the reference time period ("baseline"). The results of this query are then further reduced to include only the Partner-Client-Week records in the dataset where valid values exist for all weeks within the measurement period and baseline period.

Using the reduced set of Partner-Client-Week data from Fetch Data, the metric(s) desired are retrieved from the metric manager and applied to the data for each client. The resultant values are raw calculated metric values for each client included within the scope of the measurement. By way of a specific example, FIGS. 4A-B tabulates a list of metrics and associated calculation algorithms that may be executed using the process.

In accordance with an aspect the raw index may be further checked for errors. By way of an example the Quality Checks tests at this point are summarized in FIG. 5. Most of these checks are manual in nature with the exception being statistical measurement of historical correlations of the dataset (i.e., whether, based on past history, we should expect a client's results in a given region or country to correlate well with the aggregate Index). These calculations are calculated at the worldwide, regional, and country level and presented in table form. These are also included in the "Exception Log" report. By way of a specific example of a report generated is illustrated in FIG. 5.

All raw metrics are compared to the control limits defined within the Inclusion/Exclusion Manager. In cases where they fall above or below the determined limits, they are set to the limit and flagged for further inspection. Each value that has been flagged is reviewed and modified. In cases where the apparent outlier is a valid result, they have the option to override. After outliers are adjusted and the values for each Client-Week measure are finalized, Index metrics are aggregated across clients up to the "Week" level and written out to a common data table.

Seasonal factors for channel activity are calculated to represent the average percentage of total of all business volume in a year that is transacted in a single week. This provides users with the factors necessary to adjust their own sales forecasts based in the current seasonal pattern. Part of the process is to filter out current business growth or decline and provide user with a pure estimate of the percentage of total year's business that will be transacted in a single week. The Index Platform (Seasonal Adjustment Generator) calculates a seasonal adjustment for each week and segment combination and then multiples that the raw calculated metrics against the seasonal factor to yield a seasonally adjusted metric.

Using the Index Platform's Quality Checker raw and seasonally adjusted values are checked to ensure values reported in previous periods are the same in the current period and the same when comparing one report to another. Also, new values are checked against known standards, such as the US Consumer Sentiment Index, to ensure reported trends fit the current business context. Any issues uncovered are treated like outliers or as a quality issue where they are researched and either adjusted or not reported.

Each week of completed calculations is treated as a standard of measure for that week and is therefore stored for use in future quality evaluations or issue resolution.

The indexes that are generated may then be used to form various reports. Multiple manipulations and presentations of the finalized index values are executed to generate final reports.

The Report Generator of the Index Platform provides the calculated data sets in standard tabular formats. These tabular and graphical representations are further manipulation and consolidation to yield the format needed. By way of a example FIGS. 6A-J illustrates various reports that may be generated using the process.

In accordance with an aspect a final quality assurance check is carried out on the reports to evaluate and to ensure that the report meets visual, ease of use and business context standards. FIG. 7 illustrates the various quality checks that may be carried out on the final reports.

These reports may then be distributed via any means including email, web download, and interactive applets The subject invention provides for a method of generating a quantitative indicator of sales for a market segment for a predetermined time period, the market segment representing a plurality of members with one or more products comprising receiving sales data from the plurality of members of the market segment, the sales data including the number of units of the product sold over the predetermined period of time, calculating the quantitative indicator for each member of the market segment, the quantitative indicator being a ratio of the number of units of the product sold by the member in the predetermined time period to the number of units sold by the member in a baseline period multiplied by a baseline benchmark, the baseline benchmark being the quantitative indicator for the member in the baseline period, wherein the baseline period is the period prior to the predetermined period, calculating the quantitative indicator for the market segment by creating a composite of the quantitative indicator for each member representing the market segment, the calculation of the quantitative indicator including determining missing sales data for a member forming the market segment; and either calculating the quantitative indicator for the member with missing data using a estimated value of units of the product sold by the member or modifying the baseline benchmark by removing the data of the member with missing data.

Such method wherein the process further comprises of calculating quantitative indicator for a new member added to the market segment, the quantitative indicator being a ratio of numbers of units of the product sold by the new member in the predetermined time period to the number of units sold by the new member in the baseline period multiplied by the quantitative indicator of the market segment in the baseline period.

Such method wherein the predetermined period is one week.

Such method wherein the baseline period is the quarter prior to the predetermined period.

Such method wherein the sales data is received in a plurality of formats.

Such method further comprises consolidating the sales data into a single electronic format.

Such method wherein the number of units of the products sold by each member is multiplied by price of the product in a single currency prior to the calculation of the quantitative indicators for each member.

Such method wherein the method further comprises of inferring the prices of a product in a single currency for which no prices are available, the process comprising estimating a median value of prices from past sales data received from members.

Such method further comprising identifying errors in the quantitative indicators by comparing the value of the quantitative indicators with previous values for the quantitative indicators and determining variations in the quantitative indicator values beyond a pre-determined threshold.

Such method further comprising preparing various reports based on the calculated quantitative indicator for the market segment.

The subject invention further provides for a system for generating a quantitative indicator of sales for a market segment for a predetermined time period, the market segment representing a plurality of members with one or more products, the system comprising a data loader configured for receiving sales data from the plurality of members of the market segment, the sales data including the number of units of the product sold over the predetermined period of time, a processing engine configured for generating the quantitative indicator of sales for a market segment, the processing engine comprising a metric manager configured for calculating the quantitative indicator for each member of the market segment, the quantitative indicator being a ratio of the number of units of the product sold by the member in the predetermined time period to the number of units sold by the member in a baseline period multiplied by a baseline benchmark, the baseline benchmark being the quantitative indicator for the member in the baseline period, wherein the baseline period is the period prior to the predetermined period, missing data manager configured for determining missing sales data for a member forming the market segment, and an index generator configured for calculating the quantitative indicator for the market segment by creating a composite of the quantitative indicator for each member representing the market segment, the calculation of the quantitative indicator including determining missing sales data for a member forming the market segment; and either calculating the quantitative indicator for the member with missing data using a estimated value of units of the product sold by the member or modifying the baseline benchmark by removing the data of the member with missing data.

Such system wherein the data loader is configured for receiving data in various electronic formats.

Such system, wherein the system further comprises of a user interface, configured for allowing a member of the market segment to directly input the sales data into the data loader by directly accessing the data loader via an internet connection.

Such system, further comprising an inclusion/exclusion manager configured for identifying errors in the quantitative indicators by comparing the value of the quantitative indicators with previous values for the quantitative indicators and determining variations in quantitative indicator values beyond a pre-determined threshold.

Such system, wherein the system further comprises of a report generator configured for preparing various reports based on the calculated quantitative indicator for the market segment.

The process and system as disclosed allows for generating a reliable index in real time using data missing or unreliable elements. The index generated, is weighed by their market value, adjusted for currency fluctuations, adjusted for seasonal variations and ensuring the index calculations meet established quality standards and correlate with establish market benchmark. Moreover the system and method enables the process to be completed within hours what previously would have taken weeks and therefore allows reports to be formed almost as soon as the data is available. The present invention is useful for providing accurate calculations of sales and inventory performance for products selling through global reseller channels. The index produced using the process and system disclosed is representative of a large market segment while only using a small basket of manufacturers, products and channels in the sample pool that are both similar enough to make sense to aggregate and broad reaching enough to make the basket representative of the channel as a whole. More over the index is stable and provides anonymity of restricted, non-public financial information for participating manufacturers.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of generating a quantitative indicator of sales for a market segment for a predetermined time period, the market segment representing a plurality of members with one or more products, the method comprising:

receiving sales data from the plurality of members of the market segment, the sales data including a number of units of a product sold over the predetermined time period;

calculating, at least using a processor, a quantitative indicator for each member of the plurality of members of the market segment, the quantitative indicator for each member of the plurality of members of the market segment being a ratio of the number of units of the product sold by a respective member of the plurality of members of the market segment in the predetermined time period to the number of units of the product sold by the respective member in a baseline period multiplied by a baseline benchmark, the baseline benchmark being a quantitative indicator for the respective member in the baseline period, wherein the baseline period is a period prior to the predetermined period;

calculating, at least using a processor, the quantitative indicator of sales for the market segment by creating a composite of the quantitative indicator for each member of the plurality of members representing the market segment, the calculation of the quantitative indicator of sales for the market segment including:

determining missing sales data for a member of the plurality of members forming the market segment;

indicating that the missing sales data is to be estimated or removed by comparing a time period for which the missing sales data is missing to a predefined time period; and either calculating the quantitative indicator for the member with missing sales data using an estimated value of units of the product sold by the member with missing sales data or modifying the baseline benchmark by removing the sales data of the member with missing sales data.

2. A method as claimed in claim 1, wherein the process further comprises of calculating quantitative indicator for a new member added to the market segment, the quantitative indicator for the new member being a ratio of numbers of units of the product sold by the new member in the predetermined time period to the number of units sold by the new member in the baseline period multiplied by a quantitative indicator of the market segment in the baseline period.

3. A method as claimed in claim 1, wherein the predetermined period is one week.

4. A method as claimed in claim 1, wherein the baseline period is the quarter prior to the predetermined period.

5. A method as claimed in claim 1, wherein the sales data is received in a plurality of formats.

6. A method as claimed in claim 5, further comprises consolidating the sales data into a single electronic format.

7. A method as claimed in claim 1, wherein the number of units of the products sold by each member is multiplied by price of the product in a single currency prior to the calculation of the quantitative indicators for each member.

8. A method as claimed in claim 7, wherein the method further comprises of inferring the prices of a product in a single currency for which no prices are available, the process comprising estimating a median value of prices from past sales data received from members.

9. A method as claimed in claim 1, further comprising identifying errors in the quantitative indicators by comparing the value of the quantitative indicators with previous values for the quantitative indicators and determining variations in the quantitative indicator values beyond a pre-determined threshold.

10. A method as claimed in claim 1, further comprising preparing various reports based on the calculated quantitative indicator for the market segment.

11. A system for generating a quantitative indicator of sales for a market segment for a predetermined time period, the market segment representing a plurality of members with one or more products, the system comprising:
  a data loader configured for receiving sales data from the plurality of members of the market segment, the sales data including a number of units of the product sold over the predetermined time period;
  a processing engine configured for generating the quantitative indicator of sales for a market segment, the processing engine comprising:
    a metric manager configured for calculating the quantitative indicator for each member of the plurality of members of the market segment, the quantitative indicator being a ratio of the number of units of the product sold by a respective member of the plurality of members in the predetermined time period to the number of units sold by the respective member in a baseline period multiplied by a baseline benchmark, the baseline benchmark being a quantitative indicator for the respective member in the baseline period, wherein the baseline period is a period prior to the predetermined period;
    a missing data manager configured for determining missing sales data for a member of the plurality of members forming the market segment, and indicating that the missing sales data is to be estimated or removed by comparing a time period for which the missing sales data is missing to a predefined time period; and
    an index generator configured for calculating the quantitative indicator of sales for the market segment by creating a composite of the quantitative indicator for each member of the plurality of members representing the market segment, the calculation of the quantitative indicator of sales for the market segment including determining missing sales data for a member of the plurality of members forming the market segment; and either calculating the quantitative indicator for the member with missing sales data using an estimated value of units of the product sold by the member with missing sales data or modifying the baseline benchmark by removing the sales data of the member with missing sales data.

12. A system as claimed in claim 11, wherein the data loader is configured for receiving data in various electronic formats.

13. A system as claimed in claim 12, wherein the system further comprises of a user interface, configured for allowing a member of the market segment to directly input the sales data into the data loader by directly accessing the data loader via an internet connection.

14. A system as claimed in claim 11, wherein the system further comprises of a user interface, configured for allowing a member of the market segment to directly input the sales data into the data loader by directly accessing the data loader via an internet connection.

15. A system as claimed in claim 11, further comprising an inclusion/exclusion manager configured for identifying errors in the quantitative indicators by comparing the value of the quantitative indicators with previous values for the quantitative indicators and determining variations in quantitative indicator values beyond a pre-determined threshold.

16. A system as claimed in claim 11, wherein the system further comprises of a report generator configured for preparing various reports based on the calculated quantitative indicator for the market segment.

17. A method of generating a quantitative indicator of sales for a market segment for a predetermined time period, the market segment representing a plurality of members with one or more products, the method comprising:
  receiving sales data from the plurality of members of the market segment, the sales data including a number of units of a product sold over the predetermined time period;
  multiplying the number of units of the product sold by a price of the product sold in a single currency;
  calculating a quantitative indicator for each member of the plurality of members of the market segment, the quantitative indicator for each member of the plurality of members of the market segment being a ratio of the number of units of the product sold by a respective member of the plurality of members of the market segment in the predetermined time period to the number of units of the product sold by the respective member in a baseline period multiplied by a baseline benchmark, the baseline benchmark being a quantitative indicator for the respective member in the baseline period, wherein the baseline period is a period prior to the predetermined period;
  calculating, at least using a processor, the quantitative indicator of sales for the market segment by creating a composite of the quantitative indicator for each member of the plurality of members of the market segment, the calculation of the quantitative indicator of sales for the market segment including:
    determining missing sales data for a member of the plurality of members of the market segment;
    indicating that the missing sales data be estimated or removed by comparing a time period for which the missing sales data is missing to a predefined time period;
    either calculating the quantitative indicator for the member with missing sales data using an estimated value of units of the product sold by the member with missing sales data or modifying the baseline benchmark by removing the sales data of the member with missing sales data, wherein the estimated value of units of the product sold is interpolated as a linear average;
  identifying an error in the quantitative indicator of sales-for the market segment-by comparing a value of the quantitative indicator of sales for the market segment with a previous value for the quantitative indicator of sales for the market segment and determining a variation in the value of the quantitative indicator and the previous value of the quantitative indicator beyond a pre-determined threshold; and
  preparing various reports based on the quantitative indicator of sales for the market segment.

* * * * *